United States Patent [19]
Gujral et al.

[11] Patent Number: 5,907,037
[45] Date of Patent: May 25, 1999

[54] CELLULOSIC ION-EXCHANGE MEDIUM, AND METHOD OF MAKING AND USING THE SAME

[75] Inventors: Bir Singh Gujral; Harpreet S. Chadha, both of Raleigh, N.C.

[73] Assignee: Central Technology, Inc., Raleigh, N.C.

[21] Appl. No.: 08/638,299

[22] Filed: Apr. 26, 1996

[51] Int. Cl.[6] .................................. C08B 5/00; C08B 5/14; B01D 15/00; B01J 39/04
[52] U.S. Cl. .............................. 536/59; 536/58; 210/660; 210/681; 423/1
[58] Field of Search .................................. 536/30, 32, 43, 536/59, 63, 33; 252/184; 210/660, 681; 423/1

[56] References Cited

U.S. PATENT DOCUMENTS

| | | | |
|---|---|---|---|
| 1,734,291 | 11/1929 | Gebauer-Fuelnegg | 536/33 |
| 2,511,229 | 6/1950 | Thomas | 536/33 |
| 2,697,093 | 12/1954 | Jones | 536/59 |
| 2,969,355 | 1/1961 | Malm et al. | 536/33 |
| 3,691,154 | 9/1972 | Bernardin | 260/219 |
| 4,200,735 | 4/1980 | Sano et al. | 536/30 |
| 4,242,506 | 12/1980 | Schweiger | 536/59 |
| 4,260,740 | 4/1981 | Carrington et al. | 536/63 |
| 4,892,685 | 1/1990 | Magnin et al. | 252/628 |
| 5,093,486 | 3/1992 | Diamantoglou | 536/20 |
| 5,175,193 | 12/1992 | Heller et al. | 521/31 |
| 5,447,859 | 9/1995 | Prussak | 435/239 |

FOREIGN PATENT DOCUMENTS 479277  4/1979  U.S.S.R. .
378044  8/1932  United Kingdom .

OTHER PUBLICATIONS

Gujral et al., The Fourth North American Symposium on Society and Resource Management, Book of Abstracts, 1991, 121–Regional Forestry, May 17, 1992.

Gujral, B.S. et al., "Waste Management of Papermill Sludge for Recycling its Effluents," abstract of presentation given at The Fourth North American Symposium on Society and Resource Management, May 17–20, 1992.

Gujral, B.S. et al., "Treatment of Wastewaters by Indigenously Prepared Cation–Exchangers," paper presented at All India Seminar on Protection of Fresh Water Bodies from Pollution, Varanasi, Apr., 1992.

Gujral, Bir Singh, "A Study of Conversion of Rice–Husk to Ion–Exchanger", thesis submitted to The University of Meerut, 1985.

Shet et al. *Cellulose Chem. Technol.*, vol. 18(1): 41–48, Jan./Feb. 1984.

*Primary Examiner*—Howard C. Lee
*Attorney, Agent, or Firm*—Central Technology, Inc.

[57] ABSTRACT

A cellulosic cationic ion-exchange composition is formed by sulfonation of activated cellulose having of high surface area characteristics, using an acid such as concentrated $H_2SO_4$. The sulfonated material is convertible into different forms, viz., H-form, Na-form, K-form, $NH_4^+$ form, Ba-form, Ca-form, and Cu-form by appropriate reaction. The cation-exchanger has been found useful to treat industrial effluents for the removal of heavy metals, to achieve recovery of precious metals, to carry out water-softening, and the like.

18 Claims, No Drawings

CELLULOSIC ION-EXCHANGE MEDIUM, AND METHOD OF MAKING AND USING THE SAME

BACKGROUND OF THE INVENTION

1. Field of the Invention

This invention relates to ion-exchange materials and is particularly concerned with sulfonated cellulose which is activated and has large surface area, and sulfonic acid salt derivatives thereof, having ion-exchange properties, and with cost-effective processes for the preparation and use of such materials. The products have particular utilities in efficiently and economically removing heavy metal ions from aqueous solutions, for example in the treatment of industrial and municipal effluents, and in precious metal recovery.

2. Description of the Related Art

Ion-exchange compositions consist of cross-linked, high polymeric structures to which are attached ionizable groups. Cation-exchange properties arise due to the presence of one or more functional groups on the polymeric matrix, such as the strongly acidic sulfonic acid functionality ($-SO_3H$), the weakly acidic carboxylic acid functionality ($-COOH$), or the very weakly acidic phenolic functionality ($-OH$).

The phenomenon of ion-exchange was first reported by two British agricultural chemists in 1850, who proved that soil can remove potassium or ammonium salt from water with the release of an equivalent amount of the calcium salt. Adams and Holms used ion-exchange resins consisting of a three-dimensional network of polymeric chains crosslinked with short chain-containing ionizable fictional groups. By the proper use of these ions, it is possible, in principle, to replace any ion in a solution by another ion of like charge by an ion-exchange process in which ions in the solution are exchanged with the ions in the resin.

The classic ion exchange studies of Gans are probably the first attempts to utilize ion exchangers for industrial purposes. Gans employed both natural and synthetic aluminum silicates for softening waters and also for treating sugar solutions. Although alumino-silicates are widely used in water treatment and other fluid purification and treatment applications, they typically are limited in achieving satisfactory results to processes under nearly neutral conditions, in which the pH ranges from 6.5 to 7.5. This problem was later solved with the development of sulfonated coal as a cation exchange. Adams and Holmes observed that certain synthetic resins are capable of exchanging ion. They found, for example, that crushed phonograph records are capable of exchanging ions. They further established that stable and high capacity cation exchanger could be obtained using sulfonic acid resins and that polyamine type resins exhibited good anion exchange properties. The pioneering work of Adams and Holmes was followed by D'Alelio in the U.S. which led to the synthesis of ion exchange resins derived from styrene and the acrylics.

D'Alelio's synthesis of sulfonated copolymers of styrene and divinylbenzene yielded strong acid resins. I. G. FarbenIndustrie synthesized phenol-fomaldehyde resins with sulfonic groups attached to the rings through methylene groups.

Against this historical background, there is a continuing research and development effort directed to the synthesis of new cationic and anionic ion exchanger materials.

Cellulose is the most important structural component in plants and is present mainly in the cell wall. Yckel and Kenyan showed that oxidation of primary-alcohol groups in cellulose produces a weak acid cation-exchanger. Sober and Peterson investigated the preparation and properties of cellulosic ion exchangers, work which was extended by Porath and Somenza. Peterson worked on biologically active polyelectrolytes and determined their net charge characteristics.

A number of ion-exchanger materials are commercially available, which include, by way of example, oxycellulose, cellulose succinic esters, and a variety of treated cotton fabrics. Peterson and Sober prepared cellulose ion-exchange materials by the reaction of a chloro-compound with cellulose which had been allowed to swell in a strong alkali.

Other research approaches to the development of cationic ion exchange materials include the bonding of cation-exchanger compositions to microporous silica. Such compositions may be subjected to functionalizing reactions to introduce different ionic functional groups into the bound cation-exchange material.

SUMMARY OF THE INVENTION

The present invention contemplates a cation-exchanger material, and its methods of synthesis and use.

In one aspect, the invention relates to a method of making a cationic cellulosic ion-exchange medium from a cellulosic starting material, comprising:

impregnating the cellulosic starting material with an aqueous solution of an activating agent selected from the group consisting of zinc chloride, potassium carbonate, sodium carbonate, phosphoric acid, and sulfuric acid, to yield a wet activated cellulosic material;

drying the wet activated cellulosic material to yield a dry activated cellulosic material;

subjecting the dry activated cellulosic material to mechanical shear for sufficient time and at sufficient mechanical shear intensity to increase the surface area thereof by a factor of at least two, preferably by a factor of from two to ten, e.g., about five, relative to the starting dry activated cellulosic material, to yield a flocculant activated cellulosic material;

sulfonating the flocculant activated cellulosic material with a sulfonating agent for sufficient time and at sufficient elevated temperature to functionalize the flocculant activated cellulosic material with sulfonic acid ($-SO_3H$) groups;

cooling the flocculant activated cellulosic material functionalized with sulfonic acid ($-SO_3H$) groups to ambient temperature; and washing the cooled flocculant activated cellulosic material functionalized with sulfonic acid ($-SO_3H$) groups, to remove therefrom residual sulfate ion ($-SO_4^-$) and metal ion deriving from said activating agent, to yield the cationic cellulosic ion-exchange medium.

In such method, the starting cellulosic material may for example comprise at least one cellulosic component selected from the group consisting of wood pulp, paper mill sludge, saw-dust, rice-husks, wheat-straw, and rice-straw. The aqueous solution of activating agent may be of any suitable concentration, but suitably contain from about 1 to about 5% by weight of the activating agent, based on the weight of the solution.

The sulfonating agent in the above-described synthesis illustratively comprises a sulfur-containing compound, preferably in concentrated pure form, selected from the group consisting of sulfuric acid, chlorosulfonic acid, and sulfur trioxide. The sulfur compound preferably is used in the proportion of from about 40 to about 75 percent of the total weight of the sulfonating agent and flocculant activated cellulosic material prior to any heating thereof. The contacting of the the cellulosic starting material with an aqueous solution of an activating agent is advantageously carried out for a period of from about 20 to about 30 hours.

In the above-described method of the invention, the flocculent activated cellulosic material is desirably maintained in substantially anhydrous condition during the sulfonating step by removal of byproduct water produced in such step from the flocculant activated cellulosic material. The substantially anhydrous condition may for example comprise a water content of said flocculant activated cellulosic material of less than 5% by weight, more preferably less than 1% by weight, based on the dry weight of the flocculent activated cellulosic material. The flocculant activated cellulosic material may be maintained in such substantially anhydrous condition during the sulfonating step by removal of byproduct water produced in such step from the flocculant activated cellulosic material, at a pressure of less than 150 mm Hg.

Advantageously, the sulfonating step is conducted at a temperature in the range of from about 100° C. to about 150° C., and more preferably in the range of from about 125° C. to about 145° C.

In a particularly preferred embodiment of the method aspect of the present invention, the activating agent comprises zinc chloride, the sulfonating agent comprises sulfuric acid, the contacting of the cellulosic starting material with an aqueous solution of an activating agent is carried out for a time of from about 20 to about 28 hours, the sulfuric acid is used at a proportion of from about 50 to about 70 percent of the total weight of the sulfonating agent and flocculant activated cellulosic material prior to any heating thereof, and the sulfonating step is carried out at a temperature of from about 125° C. to about 145° C. for a time of from about 1 to about 3 hours.

In the above-described synthesis of the cationic ion-exchange material, the cooled flocculent activated cellulosic material functionalized with sulfonic acid (—$SO_3H$) groups may be pulverized, prior to washing thereof, to produce a particulate sulfonated cellulosic material.

After its initial synthesis, the cationic cellulosic ion-exchange medium may be further functionalized via reaction with a salt of a metal selected from the group consisting of sodium, magnesium, calcium, strontium, barium, copper, and zinc, to yield a cationic cellulosic ion-exchange medium functionalized with sulfonic acid salt groups of said metal. Alternatively, the cationic cellulosic ion-exchange medium may be functionalized via reaction with a solution of ammonium chloride, to yield a cationic cellulosic ion-exchange medium functionalized with ammonium groups ($NH_4^+$).

In another aspect, the present invention contemplates a cationic ion exchange material, formed by reaction of a cellulosic starting material with an aqueous solution of an activating agent selected from the group consisting of zinc chloride, potassium carbonate, and sodium carbonate, which thereafter has been dried and subjected to mechanical shear for sufficient time and at sufficient mechanical shear intensity to increase the surface area thereof by a factor of at least two, preferably by a factor of from two to ten, e.g., about five, relative to the starting cellulosic material, and functionalized with functional groups selected from the group consisting of (i) sulfonic acid (—$SO_3H$) groups, (ii) metal salts of such sulfonic acid groups, comprising a metal selected from the group consisting of sodium, magnesium, calcium, strontium, barium, copper, and zinc, and (iii) ammonium groups.

Such cationic ion exchange material in a specific embodiment has an ion exchange capacity of from about 0.9 to about 3.8 milliequivalents per gram thereof, for heavy metals selected from the group consisting of copper, zinc, mercury, silver, and cadmium. The cationic ion exchange material of the invention may be of any suitable form for its intended end use, e.g., of particulate form having a particle size in the range of from about 10 mesh to about 60 mesh. Specific useful cationic exchange materials of such type may for example have a particle size in the range of from about 10 mesh to about 20 mesh, or a particle size in the range of from about 20 mesh to about 40 mesh, or a particle size in the range of from about 40 mesh to about 60 mesh.

The cellulosic starting material of the cation-exchange material of the invention may for example comprise at least one cellulosic component selected from the group consisting of wood pulp, paper mill sludge, saw-dust, rice-husks, wheat-straw, and rice-straw.

In yet another aspect, the present invention relates to a method of processing a fluid for cationic ion exchange treatment thereof to remove a metal ion species from the fluid, comprising:

impregnating the fluid with a cellulosic ion exchange material, wherein the cellulosic ion exchange material has been formed by reaction of a cellulosic starting material with an aqueous solution of an activating agent selected from the group consisting of zinc chloride, potassium carbonate, sodium carbonate, phosphoric acid, and sulfuric acid, which thereafter has been dried and subjected to mechanical shear for sufficient time and at sufficient mechanical shear intensity to increase the surface area thereof by a factor of at least two, preferably by a factor of from two to ten, e.g., about five, relative to the starting cellulosic material, and functionalized with functional groups selected from the group consisting of (i) sulfonic acid (—$SO_3H$) groups, (ii) metal salts of such sulfonic acid groups, comprising a metal selected from the group consisting of sodium, magnesium, calcium, strontium, barium, copper, and zinc, and (iii) ammonium groups; and recovering a treated fluid of reduced metal ion content.

The cellulosic ion exchange material used in such method may have an ion exchange capacity of from about 0.9 to about 3.8 milliequivalents per gram thereof, for heavy metals selected from the group consisting of copper, zinc, mercury, silver, and cadmium. The cellulosic ion exchange material may be of particulate form having a particle size in the range of from about 10 mesh to about 60 mesh. The cellulosic starting material of such cellulosic ion exchange material advantageously comprises at least one cellulosic component selected from the group consisting of wood pulp, paper mill sludge, saw-dust, rice-husks, wheat-straw, and rice-straw.

The fluid in the above-described processing method may for example comprise an aqueous medium, such as a wastewater effluent. Alternatively, the fluid may contain a precious metal for which the cellulosic ion exchange material is removingly effective, such as copper, zinc, mercury, silver, and/or cadmium.

In such processing method, the cellulosic ion exchange material may be regenerated after recovering a treated fluid of reduced metal ion content for sufficient time to exhaust the capacity of such cellulosic ion exchange material, such regenerating comprising contacting the cellulosic ion exchange material with a diluted mineral acid for sufficient time to restore the capacity of said cellulosic ion exchange material for removing the metal ion content of said fluid by contact therewith.

Other aspects, features, and embodiments of the invention are more fully described hereinafter.

DETAILED DESCRIPTION OF THE INVENTION, AND PREFERRED EMBODIMENTS THEREOF

The present invention is based on the discovery that a cationic cellulosic ion-exchange medium of high ion-exchange capacity can be readily formed from a cellulosic starting material, by a synthesis process including the steps of:

impregnating the cellulosic starting material with an aqueous solution of an activating agent selected from the group consisting of zinc chloride, potassium carbonate, sodium carbonate, phosphoric acid, and sulfuric acid, to yield a wet activated cellulosic material;

drying the wet activated cellulosic material to yield a dry activated cellulosic material;

subjecting the dry activated cellulosic material to mechanical shear for sufficient time and at sufficient mechanical shear intensity to increase the surface area thereof by a factor of at least two, preferably by a factor of from two to ten, e.g., about five, relative to the starting dry activated cellulosic material, to yield a flocculant activated cellulosic material;

sulfonating the flocculant activated cellulosic material with a sulfonating agent for sufficient time and at sufficient elevated temperature to functionalize the flocculant activated cellulosic material with sulfonic acid ($-SO_3H$) groups;

cooling the flocculant activated cellulosic material fictionalized with sulfonic acid ($-SO_3H$) groups to ambient temperature; and washing the cooled flocculant activated cellulosic material functionalized with sulfonic acid ($-SO_3H$) groups, to remove therefrom residual sulfate ion ($-SO_4^=$) and metal ion deriving from said activating agent, to yield the cationic cellulosic ion-exchange medium, which may then be further functionalized by readily conducted reactions to form sulfonic acid salt forms or ammonium forms of the cationic exchange material.

As a specific bench-scale example of the process of the invention for forming a high ion-exchange capacity material, a starting cellulose material, e.g., a cellulosic material from a papermaking process, may be impregnated in a 2% aqueous solution of zinc chloride for 24 hours and thereafter dried in open air. Zinc chloride acts as a dehydrating agent and strips out moisture. The resulting dried cellulose is fluffed in a fluffer machine and is then blended in a laboratory blender to significantly increase the surface area of the cellulose. In a glass beaker with a glass stirrer, driven by a small electrical motor, 70 g of activated, fluffed cellulosic material is placed. With the help of separating funnel, 50 mls of concentrated sulfuric acid (specific gravity, 1.8) is added with constant stirring, and heating is continuously carried out by placement of the beaker on a hot plate.

During this process, decomposition of the cellulosic material begins with breaking of bonds and addition of sulfonic acid groups. The addition of such sulfonic acid groups is readily confirmable by chemical analysis. During the process, reduction in volume of cellulosic material as well as swelling takes place. When the swelling subsides, heating of the material is discontinued.

After cooling down from 150° C. to room temperature, the sulfonated product is partially ground in a small quantity of water and then is subjected to washing and filtration. Filtration of the ground product and washing with excess of water is then carried out until the filtrate is nearly free from $SO_4^{-2}$ ions. The product is also washed with dilute HCl until it is free from zinc ions. Drying of the washed product is carried in the open air. The dried product may then be graded and screened with the aid of different sizes of mesh sieves, e.g., to form particulate ion-exchange material with a predetermined mesh size, such as a mesh size within the following mesh size grades of "Fine", "Medium", and "Coarse" as set out in Table I below.

TABLE I

| Cationic Exchange Material | | |
|---|---|---|
| Grade | Mesh Size | Particle Size Range |
| Fine: | 40–50 mesh | 0.27–0.38 mm |
| Medium: | 30–40 mesh | 0.38–0.50 mm |
| Coarse: | 12–20 mesh | 0.83–1.52 mm |

The sulfonated activated fluffed cellulose of the invention is a novel cationic ion-exchange material having a high capacity for ion exchange reaction, and may be readily formed, as described in the above illustrative example, from a variety of cellulosic starting materials, including papermill sludge and other cellulosic waste which may otherwise present a treatment and/or disposal problem. Various forms of cellulose may be used as starting material for the cationic exchanger synthesis process, including, for example, refined cellulose powder or crude forms of cellulose from cellulosic materials such as wood pulp, paper mill sludge, sawdust, rice husks, wheat straw, and rice straw. Of the foregoing illustrative starting materials, paper mill sludge, sawdust, rice husks, wheat straw and rice straw are preferred sources of cellulose, for reasons of cost as well as the desirable ion-exchange properties of the products obtained therefrom.

Preferred sulfonating agents for the process of the invention are sulfuric acid, chloro-sulfonic acid and sulfur trioxide. The proportions of sulfuric acid, chloro-sulfonic acid, and sulfur trioxide may vary between 40% and 75% of the total weight of the mixture including cellulose and the sulfonating agent before heating. The use of substantially less than 40% by weight of the sulfonating agent yields products having too low a level of incorporation of the sulfonating groups and correspondingly lacking useful ion-exchange capacities. The use of sulfonating agents in ratios higher than 75% by weight may be employed but there appears to be no functional advantage to use of sulfonating agent concentrations beyond such limit.

Preferred activating agents are zinc chloride, potassium carbonate, sodium carbonate, phosphoric acid and sulfuric acid. The cellulosic material may be dipped in activating solutions of concentration greater than 2%, but there is no correspondingly beneficial effect on the exchange capacities of the product and more time is required to remove the activating agent ion species after sulfonating the material. If an activating agent solution having a concentration of less than 2% is used, the product formed is of correspondingly reduced exchange capacity.

The preferred period of time for contacting of cellulosic materials such as refined paper mill sludge with activator solution generally is between about 20 to about 30 hours. If the contacting time is less than about 20 hours, the final product does not give the preferred desired results. Nonetheless, the contacting period may be reduced below such contacting time lower limit, if continuous agitation of the cellulosic material is carried out, with the reduction in time depending on the rate of agitation. If the contacting period is increased more than about 30 hours, there is no effect on the exchange capacity of the resulting product.

The cellulosic materials such as rice husk, wheat straw, and rice straw are not strongly affected by the activating agents and time of dipping. The sulfonation of these materials may be carried out in the absence of the activation step.

The final dried sulfonated cellulosic materials may be ground or milled as necessary or desirable for the end use of the cation exchanger material.

In carrying out this process of the invention, the moisture content in the cellulosic materials should be low prior to and during the heating in carrying out the sulfonation step. The sulfonating agent used, for example sulfuric acid, is preferably pure and concentrated. It is preferred that the cellulosic material contains a moisture content of less than 5% by weight. It is particularly preferred that the moisture content in the cellulosic material is less than 1% by weight. The moisture content in cellulosic materials may be reduced by heating the cellulosic starting materials below a temperature of about 100° C. Activation by zinc chloride also helps to reduce the moisture content. Zinc chloride acts as a dehydrating agent and strips out moisture content. During the step of sulfonation of the cellulose, water is formed as a byproduct and this water must be removed to force the reaction to completion. The removal of the water may be obtained at atmospheric pressure, but preferably is achieved by carrying out the heating step under pressure, for example, at a pressure below 150 mm of mercury.

The temperature maintained during the sulfonation step is preferably in the range of 100° C. to 150° C., and a temperature range of 125° C.–145° C. is particularly preferred. Temperatures lower than 125° C. lead to undesirably prolonged reaction time and temperatures higher than 145° C. lead to the degradation of the product.

The time of reaction between the cellulosic material and the sulfonating agent depends on a number of factors such as the nature of cellulosic material, the proportion of the sulfonating agent present, in relation to the cellulosic material, the nature of the sulfonating agent, the type of apparatus used for the heating step, as well as the precise temperature and pressure employed. The heating preferably is continued until there is no further reaction. The time taken to complete the reaction will vary with the amount and proportion of the sulfonating agent (acid) initially present. Mixtures of cellulosic material and acid which contain higher levels of acid react faster initially but take longer to complete the reaction.

By way of further example, if cellulose powder is employed as the cellulose starting material, concentrated sulfuric acid is employed as the sulfonating agent, zinc chloride is used as the activating agent, with the time of activating agent contact with the cellulose material being 24 hours, the temperature of heating being about 140° C., and the proportion of sulfuric acid being about 60% by weight, then time required to complete the reaction is on the order of about 2 hours.

The ion-exchange capacity of the product activated cellulose ion exhanger formed as described above is illustratively determined for copper ions by taking a definite weight of the dried cationic exchanger product and adding to it a known volume of a known concentration of copper ions, for example, copper sulfate at 1000 ppm. The resulting suspension is stirred for one hour and filtered, following which the solid is washed and the filtrate made up to a known volume. The residual copper concentration is measured by a standard analytical technique. The quantity of copper absorbed by the product is calculated by the copper remaining in the solution.

This determination can also be performed by taking the product in a chromatographic column and the passing a solution of copper sulfate of a definite concentration through the column. The time of contact of copper sulfate solution with the cation exchanger product, the particle size of the product, the height and width of chromatographic column, and the temperature are also taken into consideration in such determination, which may readily be performed for characterization of the product material, within the skill of the art.

The illustrative sulfonated cellulose material prepared as described above and measured as described above is found to possess an ion-exchange capacity in the range of from about 0.9 to about 3.8 millequivalents/g for heavy metals.

The sulfonated, activated fluffed cellulose ion exchange materials of this invention are strongly acidic ion-exchange materials having utility in a wide variety of applications. These materials are capable of removing heavy metal ions, for example, copper, zinc, mercury, silver, cadmium and the like from aqueous solutions and thus the sulfonated, activated fluffed cellulose ion exchange materials of this invention are particularly useful for removal of heavy metals from industrial effluents, in various water treatement processes, and in the recovery of precious metals.

Further, the sulfonated, activated fluffed cellulose ion exchange materials of this invention are simply and readily formed from easily available and inexpensive starting materials. Such ion exchange materials are economically used for effective and efficient treatment of liquids to remove heavy metal ions therefrom.

The sulfonated, activated fluffed cellulose ion exchange materials of this invention when used for removing heavy metals can easily be regenerated by contacting dilute mineral acid with the used product, e.g., in a column or bed of the product through which the dilute mineral acid is flowed. The exchange capacity of the regenerated product is typically in the same range as the capacity of the new product, and thus the sulfonated, activated fluffed cellulose ion exchange materials of this invention can be continuously used, with intermittent regeneration, for extended periods of operation.

In this respect, it may be desirable in some instances to deploy the sulfonated, activated fluffed cellulose ion exchange materials of this invention in two or more beds, which are utilized with fluid being treated passing through active beds, while other beds are being regenerated, awaiting use, or serving as redundant back-up ion exchange beds. Such beds may be suitably manifolded and valved, to carry out continous processing of the fluid undergoing treatment, according to a suitable cycle time program.

The present invention provides a useful method for the conversion of industrial and agricultural wastes having a cellulosic matrix into a highly efficient ion exchange industrial product.

The sulfonated, activated fluffed cellulose ion exchange materials of this invention contain $—SO_3H$ sulfonic acid functional groups as ionizable groups of the material. The hydrogen ion of the sulfonic acid functional group is available for exchange reaction. This cation-exchanger material is sparingly soluble in water and non-aqueous solvents and behaves generally equivalently to a synthetic cation-exchanger resin. The exchange of mono-valent cations such as $Na^+$, $K^+$, $NH_4^+$ etc. with the hydrogen ion of the sulfonic acid functional groups is readily effected, for the utilization of the material. The uptake of these sodium, potassium, ammonium, etc. ions, under given conditions, will be determined by the amount of ionized hydrogen on the sulfonated, activated fluffed cellulose ion exchanger. The amount of hydrogen ion in turn will depend on the number of sulfonic groups on the cation-exchanger and also on the pH of the solution in equilibrium with the cation-exchanger. If a functional group behaves as a strong acid and is fully ionizable in character, the exchange reaction involves the simple distribution of monovalent cations and hydrogen ions between the cation-exchanger and the associated solution. In such case, uptake of these cations is a function of the ratio of ($M^+/H^+$) in the solution.

Consistent with the approach of Gregor, the cation exchanger can be viewed as being having affective components, viz., the un-crosslinked polyelectrolyte with solvent, and the crosslinking component. Selectivity is considered to arise primarily because of the difference in the partial volumes of counter-ions in the cation-exchanger consistent with the equation:

$$RT \ln K_{B/A} = e(V_A - V_B)$$

where $V_A$ and $V_B$ are the values for the hydrated volumes of the counter-ions A and B in the exchanger, and e is the so-called elastic counter-pressure of the exchanger.

In case of mono-functional cation-exchangers, when sodium hydroxide in the absence of neutral salt is added to the cation-exchanger, the change of pH is very much different as compared to when 0.1 N NaCl, 0.1 KCl, and 0.1 NH$_4$Cl are present. Analogous results have been found by Topp and Pepper in case of sulfonated cross-linked polystyrene. In the presence of 0.1 N NaCl, the system is at first acid, and the full capacity is realized even at low pH owing to the increase in the ratio of ($Na^+/H^+$) in the solution. The capacity of the cation-exchanger, is therefore independent of pH, provided there is a large excess of sodium ions in the solution. There is a slight difference in the exchange behavior when instead of NaCl, electrolytes like KCl and NH$_4$Cl are employed.

Considering the exchange of $Na^+$ attached to the sodium form of the cation-exchanger with that of $Ca^{++}$ in the solution:

$$2R\,Na^+ + Ca^{++} \rightleftharpoons R_2Ca^{++} + 2Na^+,$$

the equation defining selectivity coefficients is of the form $$K_{Ca++/Na++} = \frac{X_{ca++} \times (a_{Na+})^2}{a_{Ca++} \times (X_{na+})^2}.$$

The relative amounts of $Ca^{++}$ and $Na^{++}$ in the cation-exchanger depend on the total concentration of $Ca^{++}$ and $Na^{++}$ in the solution, as well as their relative concentrations.

Considering dilute solutions, the activity coefficient ratio in solution may be taken as unity, so that $$\frac{(a_{Na+})^2}{a_{Ca++}} = \frac{(m_{Na+})^2}{m_{Ca++}}.$$

When $m_{Na+}$ and $m_{Ca++}$ are the modalities of Na+ and Ca++ respectively in the solution phase, and m is the total morality of Na+ and Ca++ in the solution phase and $X_{Na+}$ and $X_{Ca++}$ the mole fractions of $Na^+$ and $Ca^{++}$ in the solution phase, there is obtained $$X_{Na+}\frac{m_{Na+}}{m_{Na+}+m_{Ca++}} = \frac{m_{Na+}}{m}$$

$$X_{ca++}\frac{m_{Ca++}}{m_{Na++}+m_{Ca++}} = \frac{m_{Ca++}}{m}$$

-continued $$\frac{(a_{Na+})^2}{a_{Ca++}} = \frac{(m_{Na+})^2}{m_{Ca++}} = \frac{m(X_{Na+})^2}{X_{Ca++}}$$

$$K_{Ca++/Na+} = \frac{X_{Ca++}\,m(X_{Na+})^2}{(X_{Na+})^2\,X_{ca++}}$$

$$\frac{m(X_{Na+})^2}{X_{Ca++}} = K_{Ca++/Na++}\frac{(X_{Na+})^2}{X_{Ca++}}$$

If the conditions are maintained such that the ionic composition of the exchanger remains constant, then $K_{Ca++/Na+}$ will also remain constant.

Exchange of $Mg^{++}$, $Ca^{++}$, $Sr^{++}$, and $Ba^{++}$ with hydrogen of sulfonic group of the cation-exchanger gives a comparable nature of ionic-selectivity of these divalent ions. However, the behavior of $Cu^{++}$, and $Zn^{++}$ deviates from the general pattern of exchange of divalent ions.

Cellulose is very resistant to a number of solvents. The sulfonation of cellulosic material in accordance with the method of the present invention yields a product cation-exchanger which has solubility properties similar to those of the original cellulose starting material.

The sulfonated, activated fluffed cellulose ion exchange material of this invention was examined microscopically and tracings indicate amorphous character, having no fixed orientations and regular structure. Cellulose is a higher molecular-weight substance formed of D-glucose units joined together via the β-position. In wood, cellulose and hemicellulose are the two main polysaccharides, and cellulose is the fibrous constituent, made up of repeated units of β-D-glucose. It is a linear macromolecule. In the wood-pulp industry, the terms α, β- and γ- cellulose are used slightly differently. Hemicelluloses are short-chain polysaccharide from non-glucose sugars. The molecular weight of native cellulose is very high and it does not dissolve in water. Most of the sulfonated, activated fluffed cellulose ion exchange material of this invention has this property, although the cationic exchangers do swell in contact with aqueous medium. Such swelling in contact with water allows penetrations of ions, from the bulk of the solution being treated with the cation exchanger, to the sites of exchange in the polymeric matrix of the cation exchanger. The insolubility of cellulose in water is attributed to cooperative hydrogen bonding. In cellulose, both glucopyranose groups are arranged in the chair form, with all the OH and CH$_2$OH groups arranged equatorially. An intramolecular hydrogen bond exists between oxygen at the C-3 position and oxygen at the C-5 position. Introduction of sulfonic acidic groups —SO$_3$H into the cellulosic matrix either by treatment with sulfuric acid or chlorosulphonic acid does not significantly change the insoluble character of the cellulosic matrix. The cation-exchanger in some instances is sparingly soluble in aqueous and non-aqueous media. The sulfonated, activated fluffed cellulose ion exchange materials of this invention, or their salt forms, preferably is not unduly soluble in the liquid being treated with such ion exchange material.

Empirical studies involving the sulfonated, activated fluffed cellulose ion exchange materials of this invention and their corresponding salt forms, and investigating the exchange of cations, monovalent and divalent, reversible equilibrium, effect of change of concentration of the electrolyte, effect of time of contact on exchange, kinetics of exchange, effect of height and cross-section of the bed or column of the exchanger material on exchange, effect of particle size of the cation-exchanger, rate of flow and effect of anion on exchange, have been carried out. The results show a comparable behavior to sulfonated coal and synthetic polymer exchanger materials.

The behavior of monovalent cations ($Na^+$, $K^+$, $NH_4^+$) and divalent cations ($Mg^{++}$, $Ca^{++}$, $Sr^{++}$, $Ba^{++}$, $Cu^{++}$, $Zn^{++}$, etc.) in the broad practice of the invention exhibit preferential and relative ion-exchange, giving rise to the application of cation exchanger compositions of the present invention to concentrate such ionic species, as well as applications in which these ions may be usefully separated from admixture with one another.

The features and characteristics of the invention are more fully shown hereinafter with reference to the following illustrative examples, wherein all parts and percentages are by weight, unless otherwise expressly stated. As used herein, the "fine", "medium" and "coarse" designations of the activated fluffed cellulose ion exchange materials of this invention have reference to the particle size and mesh size characterizations set out in Table I hereinabove.

EXAMPLE 1

A quantity of the sulfonated, activated fluffed cellulose ion exchange material of the invention was prepared as described illustratively hereinearlier, functionalized with sulfonic acid groups, hereinafter termed the "H-form" of the cation exchanger material (in consequence of the $-SO_3H$ functionality). A 1 g quantity of the fine exchanger in H-form, which was previously dried in open air, was dried at 120° C. and this resin was weighed at room temperature. The weight of resin was 0.9762 g. Thus, decrease in weight of the cation exchanger, when dried at 120° C., was observed. The percentage decrease in weight of exchanger was found to be 2.38%.

Similarly, 1 g of a corresponding finely ground cation exchanger according to the invention, in Na-form (i.e., functionalized with $-SO_3^-Na^+$ functional groups), also referred to as the sodium salt form of the cation exchanger of the invention, as previously dried in open air, was dried at 120° C. and weighed. The weight of resin was 0.9338 g. and the percentage decrease in weight of exchanger, when dried at 120° C., was 6.62%.

EXAMPLE 2

1 g of fine exchanger in H-form was placed in a weighed silica crucible, and the crucible was heated to red hot appearance, until the black color of resin turned to white. This form of resin was weighed along with silica crucible. The procedure was repeated until a constant weight was observed. The weight of ash (white) was 0.2298 g. and the decrease in weight of resin was found to be 0.7702 g. The percentage decrease in weight of the resin due to such processing was 77.02%.

EXAMPLE 3

1 g of fine cation exchanger in Na-form was placed in a silica crucible. The crucible was heated to red hot appearance, until the black color of the resin turned to white. Then 3–4 drops of 50% $H_2SO_4$ were added and the crucible was again heated to red hot appearance, following which the crucible along with its content was weighed. This procedure was repeated until a constant weight of contents was achieved. The weight of contents was 0.5230 g. The decrease in weight of resin was 0.4770 g. and the percentage decrease in weight was 47.70%.

EXAMPLE 4

5 g of medium exchanger in H-form, which was previously dried at 120° C., was utilized. The volume occupied by the resin was 14.5 ml. This resin then was wet with water and the volume occupied by wet resin was found to be 18.5 ml.

The increase in volume occupied by wet resin was calculated. The percentage increase in volume occupied by wet resin (dried in air) was found to be 6.9% and the percentage increase in volume occupied by wet resin (dried at 120° C.) was found to be 27.59%.

EXAMPLE 5

5 g of coarse exchanger in H-form, which was previously dried in open air, was utilized. The volume occupied by this resin was 14.0 ml. This resin was allowed to remain in contact with sufficient amount of water so that it became fully swollen. The volume occupied by this wet resin was found to be 15.5 ml.

EXAMPLE 6

5 g of coarse exchanger in H-form, previously dried at 120° C., was measured and the volume occupied by the resin was 14.0 ml. This resin then was wet as discussed above and the volume occupied by the wet resin was determined to be 14.0 ml.

No change in volume occupied by wet resin (dried at 120° C.) was observed. The percentage increase in volume occupied by wet resin (dried in air) was found to be 10.71%.

EXAMPLE 7

Further studies were carried out with activated fluffed cellulose ion exchange material of this invention in sodium form and the volumes occupied were determined as in previous examples. 5 g of fine exchanger in Na-form, which was previously dried in open air, was measured. The volume occupied by the wet resin was found to be 11.0 ml.

EXAMPLE 8

5 g of fine exchanger in Na-form, previously dried at 120° C., was measured. The volume occupied by the resin was 11.0 ml. Then the resin was wet with water and the volume occupied by wet resin was found to be 12.5 ml.

An increase in the volume occupied by wet resin, which was previously dried at 120° C., was observed. No change in the volume occupied by wet resin (previously dried in air) was observed. The percentage increase in volume occupied by wet resin (dried at 120° C.) was 13.64%.

While the invention has been illustratively described herein with reference to specific aspects, features, modifications, variations and embodiments, it will be appreciated that the invention may be embodied and practiced with other features and aspects, in numerous other modifications, variations and embodiments, and the invention is therefore to be broadly construed as encompassing all such other aspects, features, modifications, variations and embodiments, within the spirit and scope of the invention as claimed.

What is claimed is:

1. A cationic ion exchange material, formed by reaction of a cellulosic starting material with an aqueous solution of an activating agent selected from the group consisting of zinc chloride, potassium carbonate, and sodium carbonate, which thereafter has been dried and subjected to mechanical shear for sufficient time and at sufficient mechanical shear intensity to increase the surface area thereof by a factor of from 2 to 10, relative to the starting cellulosic material, and functionalized with functional groups selected from the group consisting of (i) sulfonic acid (—SO$_3$H) groups, (ii) metal salts of such sulfonic acid groups, comprising a metal selected from the group consisting of sodium, magnesium, calcium, strontium, barium, copper, and zinc, and (iii) ammonium salts of such sulfonic acid groups.

2. A cationic ion exchange material according to claim 1, having an ion exchange capacity of from about 0.9 to about 3.8 milliequivalents per gram thereof, for heavy metals selected from the group consisting of copper, zinc, mercury, silver, and cadmium.

3. A cationic ion exchange material according to claim 1, of particulate form having a particle size in the range of from about 10 mesh to about 60 mesh.

4. A cationic ion exchange material according to claim 1, of particulate form having a particle size in the range of from about 10 mesh to about 20 mesh.

5. A cationic ion exchange material according to claim 1, of particulate form having a particle size in the range of from about 20 mesh to about 40 mesh.

6. A cationic ion exchange material according to claim 1, of particulate form having a particle size in the range of from about 40 mesh to about 60 mesh.

7. A cationic ion exchange material according to claim 1, whose cellulosic starting material comprises at least one cellulosic component selected from the group consisting of wood pulp, paper mill sludge, saw-dust, rice-husks, wheat-straw, and rice-straw.

8. A method of processing a fluid for cationic ion exchange treatment thereof to remove a metal ion species from the fluid, comprising:

contacting the fluid with a cellulosic ion exchange material, wherein the cellulosic ion exchange material has been formed by reaction of a cellulosic starting material with an aqueous solution of an activating agent selected from the group consisting of zinc chloride, potassium carbonate, and sodium carbonate, which thereafter has been dried and subjected to mechanical shear for sufficient time and at sufficient mechanical shear intensity to increase the surface area thereof by a factor of at least two, relative to the starting cellulosic material, and functionalized with functional groups selected from the group consisting of (i) sulfonic acid (—SO$_3$H) groups, (ii) metal salts of such sulfonic acid groups, comprising a metal selected from the group consisting of sodium, magnesium, calcium, strontium, barium, copper, and zinc, and (iii) ammonium salt of such sulfonic acid groups; and recovering a treated fluid of reduced metal ion content.

9. A method according to claim 8, wherein the cellulosic ion exchange material has an ion exchange capacity of from about 0.9 to about 3.8 milliequivalents per gram thereof, for heavy metals selected from the group consisting of copper, zinc, mercury, silver, and cadmium.

10. A method according to claim 8, wherein the cellulosic ion exchange material is of particulate form having a particle size in the range of from about 10 mesh to about 60 mesh.

11. A method according to claim 8, wherein the cellulosic starting material of said cellulosic ion exchange material comprises at least one cellulosic component selected from the group consisting of wood pulp, paper mill sludge, saw-dust, rice-husks, wheat-straw, and rice-straw.

12. A method according to claim 8, wherein the fluid comprises an aqueous medium.

13. A method according to claim 8, wherein the fluid comprises a wastewater effluent.

14. A method according to claim 8, wherein the fluid contains a precious metal which can be effectively removed by the cellulosic ion exchange material.

15. A method according to claim 8, wherein the fluid contains a metal selected from the group consisting of copper, zinc, mercury, silver, and cadmium, which metal can be effectively removed by the cellulosic ion exchange material.

16. A method according to claim 8, further comprising regenerating the cellulosic ion exchange material after recovering a treated fluid of reduced metal ion content for sufficient time to exhaust the capacity of said cellulosic ion exchange material, said regenerating comprising contacting the cellulosic ion exchange material with a diluted mineral acid for sufficient time to restore the capacity of said cellulosic ion exchange material for reducing the metal ion content of said fluid by contact therewith.

17. A cationic exchange material according to claim 1, wherein the cellulosic starting material comprises cellulose.

18. A method according to claim 8 wherein the cellulosic starting material comprises cellulose.

* * * * *